2,958,573
PURIFICATION OF URANIUM CONCENTRATES BY LIQUID EXTRACTION

Robert A. Gustison, Niagara Falls, and Frank W. Hurd, White Plains, N.Y., assignors to Union Carbide Corporation, a corporation of New York
No Drawing. Filed Sept. 25, 1956, Ser. No. 612,049
12 Claims. (Cl. 23—14.5)

This invention relates to a process for preparing high-purity uranium from uranium ore concentrates.

Uranium ore has been upgraded to an impure uranium concentrate containing from about 70 percent to 85 percent uranium as $U_3O_8$. It would be desirable to recover uranium from these concentrates to the exclusion of all other metallic impurity components.

It is the prime object of this invention to provide an extraction process whereby high-purity uranium may be recovered from uranium ore concentrates or other high-grade uranium sources.

Other objects will be apparent from the following disclosure and appended claims.

The achievement of the objects is based on the discovery that a uranium-saturated solution of a dialkyl phosphate in a water-insoluble organic diluent excludes from solution the metallic impurity components normally present in uranium concentrates. An organo-uranium complex is formed in accordance with the general reversible equation:

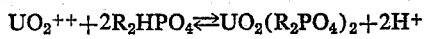

$$UO_2^{++} + 2R_2HPO_4 \rightleftharpoons UO_2(R_2PO_4)_2 + 2H^+$$

The process of the present invention consists in intimate mixing or contacting of an organic extracting solution with an aqueous acid solution of the ore concentrate so as to transfer the uranium from the aqueous acid solution to the organic extracting solution and then separating the organic phase from the aqueous phase.

The extracting solution comprises a dialkyl phosphate dissolved in an organic diluent. Dialkyl phosphates having a chain length of 6 to 12 carbon atoms are the most satisfactory. Di(2-ethylhexyl)phosphoric acid has been found to be exceptionally suitable as the organic phosphate. The organic diluent should be immiscible in water and non-reactive with the process components. Kerosene has been found to be quite satisfactory as a diluent. In addition, any water-immiscible aliphatic hydrocarbon such as naphtha or heptane, may be employed as this diluent.

The aqueous acid solution is prepared by dissolving the ore concentrate in enough mineral acid to provide a final solution having a pH in the range of from 0.1 to 3.0. If the pH is lower than 0.1, extraction is retarded while a pH appreciably greater than 3.0 causes extraction of iron, aluminum, and other unwanted constituents by the extracting solution. An oxidizing agent may be incorporated in the acid leach to convert all the uranium oxide to uranyl oxide which is soluble in mineral acids. If an oxidizing acid such as nitric acid is employed, no other oxidizing agent is required. However, nitric acid is not easily recovered and recycled; for this reason less expensive acids such as sulfuric or hydrochloric acids which can be recovered and recycled easily and efficiently may be preferred. If hydrochloric acid is employed, an oxidizing agent such as sodium chlorate is generally required. Other oxidizing agents which may be used for solubilizing the ore concentrate are hydrogen peroxide, manganese dioxide, and oxidants of a similar nature.

The aqueous solution which is fed to the extractor preferably should contain at least 10 grams per liter of uranium oxide. This feed solution and the organic extracting solution are intimately mixed so as to saturate the organic phase with uranium. The extent to which the organic phase may be saturated with uranium is dependent or the molar concentration of the dialkyl phosphate; the higher the concentration of the phosphate in the extracting solution, the greater is the capacity of the extracting solution for uranium.

The uranium-saturated organic solution is separated from the aqueous acid solution and the uranium is stripped from the loaded organic extracting solution by a stripping agent such as concentrated hydrochloric acid or alkalies such as solutions of sodium or ammonium carbonate or hydroxide.

The purity of the final product may be increased by scrubbing the loaded organic solution prior to stripping. This may be accomplished by intimately mixing the loaded extracting solution with dilute acid.

If the stripping solution is hydrochloric acid, the uranium may be separated from the strip solution in one of several ways. The strip solution may be evaporated to dryness and the resulting uranyl chloride calcined to $U_3O_8$. An alternate method comprises concentrating the strip solution by evaporation to eliminate the excess hydrochloric acid, diluting the concentrated strip solution to about 100 grams per liter of uranium oxide with distilled water, precipitating the uranium from solution as ammonium diuranate by ammonia addition, and calcining the ammonium diuranate to uranium oxide. The elimination of the excess hydrochloric acid is important since it may be recycled, thereby increasing the efficiency of operation and minimizing the costs. Further, if the hydrochloric acid were not thus removed, large amounts of ammonia would be wasted in neutralizing the acid and the ammonium chloride so produced would be precipitated from the solution in even greater quantity than ammonium diuranate.

In an example of the invention, a uranium concentrate, having the analysis shown in Table I, was dissolved in a hydrochloric acid solution containing sodium chlorate to prepare a feed solution having a pH of about 1 and containing about 100 grams of uranium oxide per liter.

Table I

| Concentrate component: | | Quantity |
|---|---|---|
| $U_3O_8$ | percent | 75.57 |
| $V_2O_5$ | do | 1.73 |
| $P_2O_5$ | do | 1.82 |
| Mo | do | 0.04 |
| Fe | do | 2.18 |
| Cu | do | 1.31 |
| Pb | do | 0.04 |
| As | do | 0.04 |
| B | p.p.m. | 24 |

The uranium in the feed solution was extracted in a single stage with a 0.1 M solution of di(2-ethylhexyl)-phosphoric acid dissolved in kerosene in such a manner that the organic solution was saturated with uranium. The uranium was stripped from the organic extracting solvent with concentrated hydrochloric acid. The strip solution was evaporated to dryness and the uranyl chloride so produced was calcined to uranium oxide. The uranium product contained 0.01 to 0.1 percent calcium, all other elements being present in less than 0.01 percent concentration.

In another example of the invention, a feed solution was prepared containing 96.96 grams per liter of uranium and having a pH of 1.5. It was contacted in a single step with a kerosene solution which was 0.1 molar in di(2-ethylhexyl)phosphoric acid to provide an organic extract containing 10 grams per liter of uranium and an aqueous acid raffinate containing 6 grams per liter.

Each volume of extract was scrubbed three times with one-tenth of a volume of 5 percent hydrochloric acid. The scrubbed extract was stripped of uranium with concentrated hydrochloric acid to give a strip solution containing 100 grams per liter of uranium, the stripped organic extracting solution retaining less than 0.05 gram per liter. The strip solution was evaporated until the uranium concentration was 2000 grams per liter and the concentrated strip solution was then diluted to a uranium concentration of 100 grams per liter. Ammonia was added to precipitate the uranium as ammonium diuranate and the precipitate was then filtered and calcined to uranium oxide. The product had the impurities shown in Table II.

Table II

| Impurity | Quantity, parts per million | Limit of Detection, parts per million |
| --- | --- | --- |
| $V_2O_5$ | Not detected | 50 |
| $P_2O_5$ | <20 | |
| Mo | <5 | |
| Fe | 20 | |
| Cu | <5 | |
| Pb | <2 | |
| B | <0.2 | |
| Al | 10 | |
| Mn | <1 | |
| Na | Not detected | 150 |
| Zn | Not detected | 20 |
| Co | Not detected | 1 |
| Mg | 1 | |
| Ni | Not detected | 2 |
| Sn | Not detected | 1 |
| Ag | Not detected | 0.1 |

As may be seen from these data, a uranium product of high purity may be obtained by the process of this invention, and it is possible in accordance with the process of the invention to obtain uranium from impure ore concentrates by liquid-liquid extraction.

What is claimed is:

1. A method for separating uranium values substantially free from contamination by other metal compounds from a uranium ore concentrate containing at least about 70 percent uranium values expressed as $U_3O_8$ comprising preparing from said ore concentrate an aqueous solution having a pH of from 0.1 to 3.0, the major portion of the uranium values in said solution being dissolved uranyl oxide; extracting a major portion of said uranium values from said aqueous solution with a solution of at least one dialkyl phosphate having a chain length of from about 6 to 12 carbon atoms and dissolved in a water-insoluble organic diluent to effect the substantially complete saturation of said uranium-extracting solution with uranium values; and separating said substantially completely saturated uranium-extracting solution from the resulting aqueous solution.

2. A method in accordance with claim 1 wherein the dialkyl phosphate is di(2-ethylhexyl)phosphoric acid.

3. A method in accordance with claim 1 wherein the organic diluent is selected from the group consisting of kerosene, naphtha and heptane.

4. A method in accordance with claim 1 wherein the organic diluent is kerosene.

5. A method for producing high-purity uranium from a uranium ore concentrate containing at least about 70 percent uranium values expressed as $U_3O_8$ comprising treating said ore concentrate with an aqueous solution of a mineral acid containing an oxidizing agent thereby solubilizing the uranium values in said ore concentrate and dissolving them in the aqueous acid to produce an aqueous acid solution having a pH in the range of from 0.1 to 3.0; extracting a major portion of the uranium values from said aqueous solution with a solution of at least one dialkyl phosphate having a chain length of from 6 to 12 carbon atoms dissolved in a water-insoluble organic diluent to effect the substantially complete saturation of said uranium extracting solution with uranium values which are substantially free from contamination from other metal compounds; separating said substantially completely saturated extracting solution from said aqueous solution; stripping the uranium values from said substantially completely saturated extracting solution with a concentrated aqueous mineral acid; separating the uranium values from the stripping solution; and calcining the uranium values to uranium oxide.

6. A method in accordance with claim 5 wherein the dialkyl phosphate is di-(2-ethylhexyl)phosphoric acid.

7. A method in accordance with claim 5 wherein the organic diluent is selected from the group consisting of kerosene, naphtha and heptane.

8. A method in accordance with claim 5 wherein the organic diluent is kerosene.

9. A method for separating uranium values substantially free from contamination by other metal compounds from a uranium ore concentrate containing at least about 70 percent uranium values expressed as $U_3O_8$ comprising preparing from said ore concentrate an aqueous solution having a pH of from 0.1 to 3.0, the major portion of the uranium values in said solution being dissolved uranyl oxide; extracting a major portion of said uranium values from said aqueous solution with a solution of di-(2-ethylhexyl)phosphoric acid dissolved in at least one water-insoluble organic diluent selected from the group consisting of kerosene, naphtha and heptane to effect the substantially complete saturation of said uranium-extracting solution with uranium values; and separating said substantially completely saturated uranium-extracting solution from the resulting aqueous solution.

10. A method in accordance with claim 9 wherein the organic diluent is kerosene.

11. A method for producing high-purity uranium from a uranium ore concentrate containing at least about 70 percent uranium values expressed as $U_3O_8$ comprising treating said ore concentrate with an aqueous solution of a mineral acid containing an oxidizing agent thereby solubilizing the uranium values in said ore concentrate and dissolving them in the aqueous acid to produce an aqueous acid solution having a pH in the range of from 0.1 to 3.0; extracting a major portion of the uranium values from said aqueous solution with a solution of di-(2-ethylhexyl)phosphoric acid dissolved in at least one water-insoluble organic diluent selected from the group consisting of kerosene, naphtha, and heptane to effect the substantially complete saturation of said uranium extracting solution with uranium values which are substantially free from contamination from other metal compounds; separating said substantially completely saturated extracting solution from said aqueous solution; stripping the uranium values from said substantially completely saturated extracting solution with a concentrated aqueous mineral acid; separating the uranium values from the stripping solution and calcining the uranium values to uranium oxide.

12. A method in accordance with claim 11 wherein the organic diluent is kerosene.

References Cited in the file of this patent

UNITED STATES PATENTS 2,769,686    McCullough et al.    Nov. 6, 1956

OTHER REFERENCES

AEC Document, RMO–2030, by Heidt et al., Sept. 13, 1954, declassified Oct. 27, 1955.

AEC Document ISC–612, by Andreson et al., June 1955.

AEC Document ORNL–1998, by Guyman et al., Nov. 15, 1955, issued June 29, 1956. Available from Oak Ridge National Lab., P.O. Box P, Oak Ridge, Tenn.

AEC Document AECU–3181, by Ross et al., April 1956.